(12) United States Patent
Takei et al.

(10) Patent No.: US 11,634,140 B2
(45) Date of Patent: Apr. 25, 2023

(54) VEHICLE CONTROL METHOD AND VEHICLE CONTROL DEVICE

(71) Applicant: Nissan Motor Co., Ltd., Yokohama (JP)

(72) Inventors: Shoichi Takei, Kanagawa (JP); Shinya Tanaka, Kanagawa (JP); Takeshi Kimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/801,727

(22) PCT Filed: Feb. 24, 2020

(86) PCT No.: PCT/IB2020/000136
§ 371 (c)(1),
(2) Date: Aug. 23, 2022

(87) PCT Pub. No.: WO2021/171049
PCT Pub. Date: Sep. 2, 2021

(65) Prior Publication Data
US 2023/0084217 A1   Mar. 16, 2023

(51) Int. Cl.
*B60W 30/095* (2012.01)
*B60W 30/18* (2012.01)
*B60W 40/107* (2012.01)

(52) U.S. Cl.
CPC .... *B60W 30/18163* (2013.01); *B60W 40/107* (2013.01); *B60W 2554/20* (2020.02); *B60W 2554/4041* (2020.02); *B60W 2554/4045* (2020.02); *B60W 2554/80* (2020.02)

(58) Field of Classification Search
None
See application file for complete search history.

(56) References Cited

U.S. PATENT DOCUMENTS

| 10,037,036 B2 * | 7/2018 | Nilsson | B60W 30/143 |
| 10,882,535 B2 * | 1/2021 | Lan | B60W 30/00 |
| 10,928,830 B1 * | 2/2021 | Tran | G06N 3/045 |

(Continued)

FOREIGN PATENT DOCUMENTS

| JP | 2005-056372 A | 3/2005 |
| JP | 2008-102690 A | 5/2008 |

(Continued)

*Primary Examiner* — Jonathan M Dager
(74) *Attorney, Agent, or Firm* — Young Basile Hanlon & MacFarlane, P.C.

(57) ABSTRACT

The vehicle control device sets a region including a stationary object on a road, calculates a passing position at which a host vehicle and an oncoming vehicle pass each other in accordance with a velocity of the host vehicle and a position and a velocity of the oncoming vehicle, calculates a first score that is a larger value as the velocity of the oncoming vehicle is greater, calculates a second score that is a larger value as an acceleration rate of the oncoming vehicle is greater, integrates the first score with the second score so as to calculate an integration score, and causes the host vehicle to decelerate when the integration score is greater than or equal to a predetermined value or causing the host vehicle to keep the velocity or accelerate when the integration score is smaller than the predetermined value.

18 Claims, 11 Drawing Sheets

(56) References Cited

U.S. PATENT DOCUMENTS

| | | | | |
|---|---|---|---|---|
| 11,124,204 B1* | 9/2021 | Narang | | G01C 21/3407 |
| 11,325,589 B2* | 5/2022 | Nagashima | | B60W 10/184 |
| 11,420,630 B2* | 8/2022 | Dax | | B60W 40/105 |
| 11,433,885 B1* | 9/2022 | Beller | | B60W 30/095 |
| 2004/0193347 A1* | 9/2004 | Harumoto | | G08G 1/16 |
| | | | | 701/45 |
| 2011/0187515 A1* | 8/2011 | Saito | | B62D 15/0265 |
| | | | | 701/1 |
| 2017/0341642 A1* | 11/2017 | Suzuki | | B60W 30/09 |
| 2018/0259967 A1* | 9/2018 | Frazzoli | | B60W 30/095 |
| 2019/0156129 A1* | 5/2019 | Kakegawa | | G06V 20/588 |
| 2019/0202450 A1* | 7/2019 | Maeda | | B60W 10/184 |
| 2019/0243371 A1* | 8/2019 | Nister | | G05D 1/0242 |
| 2019/0278290 A1* | 9/2019 | Zhang | | G01C 21/3848 |
| 2019/0369626 A1* | 12/2019 | Lui | | G05D 1/0221 |
| 2020/0086855 A1* | 3/2020 | Packer | | B60W 60/00276 |
| 2020/0139959 A1* | 5/2020 | Akella | | B60W 30/025 |
| 2020/0180648 A1* | 6/2020 | Lan | | B60W 30/0956 |
| 2021/0094538 A1* | 4/2021 | Beller | | B60W 30/09 |
| 2021/0197808 A1* | 7/2021 | Maeda | | B60W 60/005 |
| 2021/0370921 A1* | 12/2021 | Silva | | B60W 60/0027 |
| 2022/0105926 A1* | 4/2022 | Zhang | | G08G 1/166 |
| 2022/0135029 A1* | 5/2022 | Poubel Orenstein | | |
| | | | | B60W 30/0956 |
| | | | | 701/301 |
| 2022/0176948 A1* | 6/2022 | Hasegawa | | B60W 30/0956 |
| 2022/0324484 A1* | 10/2022 | Hruschka | | B60W 30/0956 |
| 2022/0410890 A1* | 12/2022 | Takei | | B60W 30/18163 |

FOREIGN PATENT DOCUMENTS

| | | |
|---|---|---|
| JP | 2009-116790 A | 5/2009 |
| JP | 2010-070069 A | 4/2010 |
| WO | 2015/198426 A1 | 12/2015 |

* cited by examiner

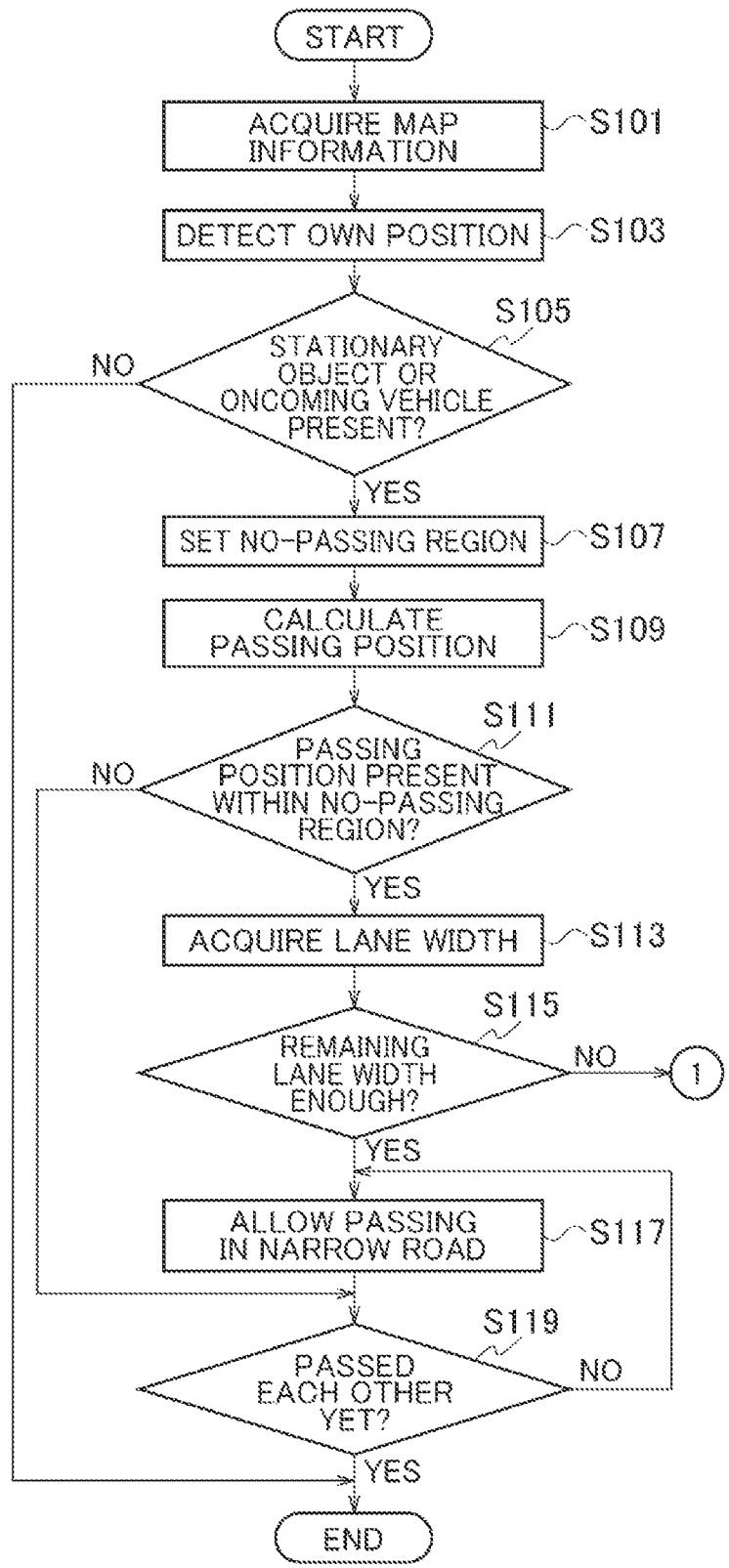

VEHICLE CONTROL METHOD AND VEHICLE CONTROL DEVICE

TECHNICAL FIELD

The present invention relates to a vehicle control method and a vehicle control device.

BACKGROUND

A drive assistance device is known that avoids an encounter with an oncoming vehicle when there is a probability that the oncoming vehicle could project from the oncoming lane toward the own lane (Japanese Unexamined Patent Application Publication No. 2008-102690). The invention disclosed in Japanese Unexamined Patent Application Publication No. 2008-102690 determines whether a passing route of the oncoming vehicle overlaps with the own lane in accordance with a distance between a parked vehicle in the oncoming lane and the center line of the road. The invention disclosed in Japanese Unexamined Patent Application Publication No. 2008-102690 leads the host vehicle to stop or decelerate when the passing route of the oncoming vehicle is determined to overlap with the own lane.

SUMMARY

The invention disclosed in Japanese Unexamined Patent Application Publication No. 2008-102690 does not take account of the intention of the driver of the oncoming vehicle and thus could cause the host vehicle to decelerate or stop unnecessarily even when the host vehicle and the oncoming vehicle can pass each other without close encounter.

To solve the conventional problem described above, the present invention provides a vehicle control method and a vehicle control device configured to take account of an intention of a driver of an oncoming vehicle.

A vehicle control method according to an aspect of the present invention sets a region including a stationary object on a road defined within a predetermined distance from the stationary object along an extending direction of the road, calculates a passing position at which a host vehicle and an oncoming vehicle pass each other in accordance with a velocity of the host vehicle and a position and a velocity of the oncoming vehicle, calculates a first score that is a larger value as the velocity of the oncoming vehicle is greater, calculates a second score that is a larger value as an acceleration rate of the oncoming vehicle is greater, integrates the first score with the second score so as to calculate an integration score, and causes the host vehicle to decelerate when the integration score is greater than or equal to a predetermined value or causing the host vehicle to keep the velocity or accelerate when the integration score is smaller than the predetermined value in a case in which the passing position is present within the region.

The present invention enables the vehicle control while taking account of the intention of the driver of the oncoming vehicle.

BRIEF DESCRIPTION OF THE DRAWINGS

FIG. 7A is a flowchart explaining an example of operation of the vehicle control device 1 according to the embodiment of the present invention;

DETAILED DESCRIPTION

Figure 1:
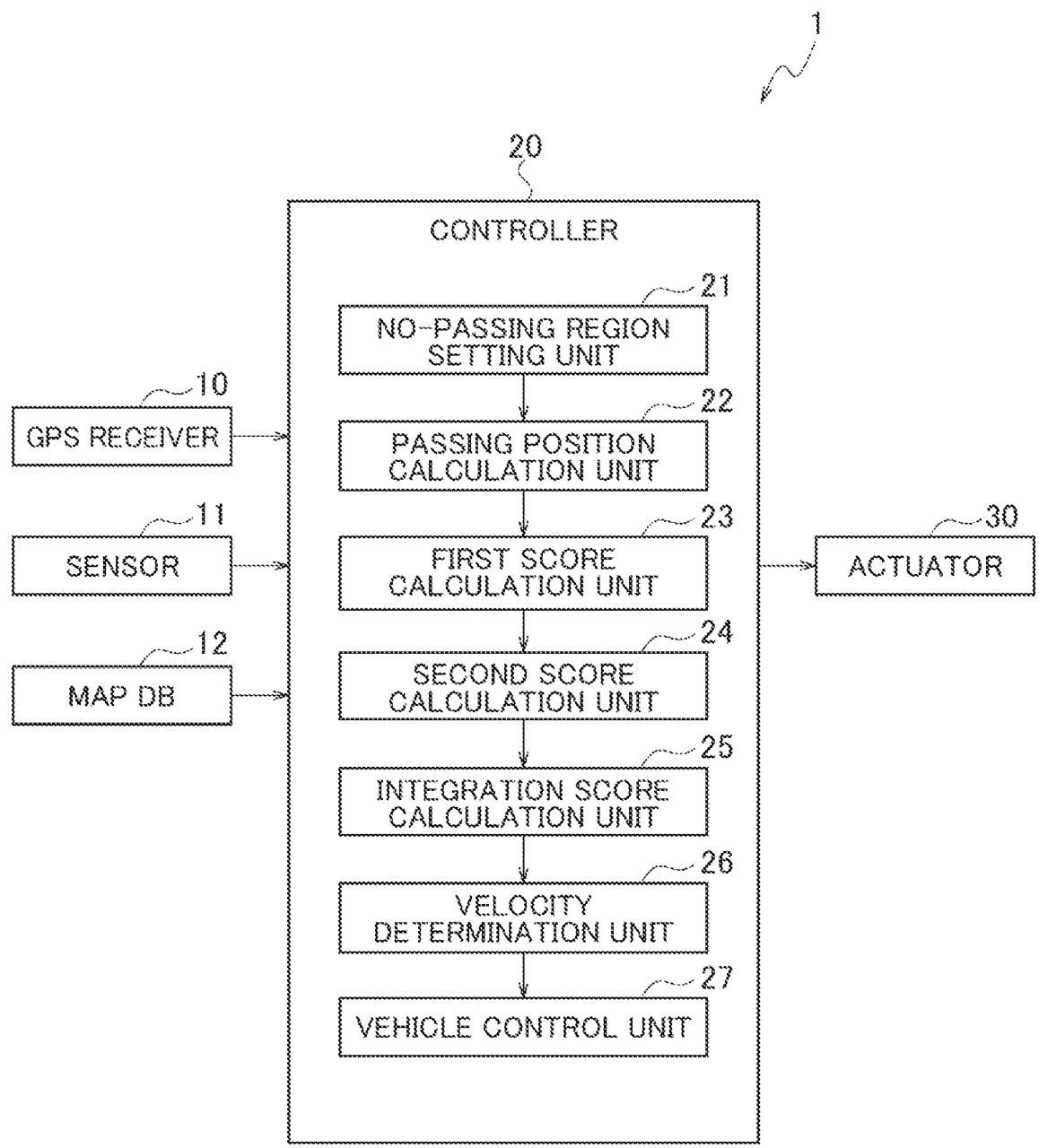
FIG. 1 is a schematic configuration diagram of a vehicle control device 1 according to an embodiment of the present invention.

Hereinafter, some embodiments according to the present invention are described with reference to the drawings. The same elements illustrated in the drawings are denoted by the same reference numerals, and overlapping explanations are not made below.

Present Embodiment

<Configuration Example of Vehicle Control Device>

A configuration example of a vehicle control device 1 according to the present embodiment is described below with reference to FIG. 1. As illustrated in FIG. 1, the vehicle control device 1 includes a GPS receiver 10, a sensor 11, a map database 12, a controller 20, and an actuator 30.

The vehicle control device 1 may be mounted on either a vehicle equipped with an automated driving function or a vehicle without equipped with an automated driving function. The vehicle control device 1 may be mounted on a vehicle capable of switching between automated driving and manual driving. The term "automated driving" as used in the present embodiment refers to a state in which at least any of actuators such as a brake, an accelerator, and a steering wheel is controlled without the intervention of operation of the occupant.

The automated driving thus can include a state in which other actuators are operated by the occupant. The automated driving also refers to a state in which any control such as acceleration/deceleration control and lateral positioning control only needs to be executed. The term "manual driving" as used in the present embodiment refers to a state in which the occupant operates the brake, the accelerator, and the steering wheel, for example.

The GPS receiver 10 receives radio waves from an artificial satellite so as to detect positional information of the host vehicle on the ground. The positional information of the host vehicle detected by the GPS receiver 10 includes the information on latitude and the information on longitude. The GPS receiver 10 outputs the detected positional information of the host vehicle to the controller 20. The means of detecting the positional information of the host vehicle is not limited to the GPS receiver 10. For example, odometry may be used to estimate the position of the host vehicle. Odometry is a way of obtaining a moving amount and an advancing direction of the vehicle in accordance with a rotation angle and an angular velocity of the vehicle so as to estimate the position of the vehicle.

The sensor 11 is a device mounted on the host vehicle to detect objects around the host vehicle. The sensor 11 includes several kinds of sensors such as a camera, lidar, a radar, a millimeter-wave radar, a laser rangefinder, and a sonar. The sensor 11 detects, as objects around the host vehicle, moving objects including other vehicles, motorcycles, bicycles, and pedestrians, and stationary objects including obstacles, fallen objects, and parked vehicles. The sensor 11 also detects a position, an attitude (a yaw angle), a size, a velocity, an acceleration rate, a deceleration rate, and a yaw rate of the respective moving objects and stationary objects with respect to the host vehicle. The sensor 11 may also include other sensors such as a wheel speed sensor (a second sensor), a steering angle sensor, and a gyro sensor. The wheel speed sensor detects a speed of rotation of the wheels of the host vehicle. Detecting the speed of rotation of the wheels can obtain a velocity of the host vehicle. The sensor 11 outputs the detected information to the controller 20.

The map database 12 is a database stored in a car navigation device, for example, and includes map information such as road information and facility information necessary for route guidance. The road information refers to information on the number of lanes on a road, road boundary lines, and a relation of connection of lanes. The map database 12 outputs the map information to the controller 20 in response to the request from the controller 20. While the present embodiment is illustrated with the case in which the vehicle control device 1 includes the map database 12, the vehicle control device 1 does not necessarily include the map database 12. The map information may be acquired by the sensor 11, or may be acquired through vehicle-to-vehicle communications or road-to-vehicle communications. When the map information is stored in a server externally installed, the vehicle control device 1 may acquire the map information from the server through communications as necessary. The vehicle control device 1 may regularly acquire the latest map information from the server so as to update the stored map information.

The controller 20 is a general-purpose microcomputer including a central processing unit (CPU), a memory, and an input-output unit. A computer program is installed on the microcomputer so as to function as the vehicle control device 1. The microcomputer functions as a plurality of information processing circuits included in the vehicle control device 1 when the computer program is executed. While the present embodiment is illustrated with the case in which the software is installed to fabricate the respective information processing circuits included in the vehicle control device 1, dedicated hardware for executing each information processing as described below can be prepared to compose the information processing circuits. The respective information processing circuits may be composed of individual hardware. The controller 20 includes, as examples of the plural information processing circuits, a no-passing region setting unit 21, a passing position calculation unit 22, a first score calculation unit 23, a second score calculation unit 24, an integration score calculation unit 25, a velocity determination unit 26, and a vehicle control unit 27.

The no-passing region setting unit 21 sets a no-passing region as a region on the road including a parked vehicle defined within a predetermined distance from the parked vehicle along the extending direction of the road. The no-passing region is set as a region within the predetermined distance from the parked vehicle along the extending direction of the road in which the host vehicle is prohibited from passing the oncoming vehicle since it is difficult for the host vehicle to pass the oncoming vehicle along the parked vehicle when the road width excluding the parked vehicle is less than a width sufficient to safely pass the oncoming vehicle.

The passing position calculation unit 22 determines whether the position at which the host vehicle and the oncoming vehicle pass each other is present within the no-passing region set by the no-passing region setting unit 21. In particular, the passing position calculation unit 22 calculates the passing position at which the host vehicle passes the oncoming vehicle in accordance with a relative distance between the host vehicle and the oncoming vehicle, a velocity of the host vehicle, and a velocity of the oncoming vehicle. The passing position calculation unit 22 then determines whether the calculated passing position is present within the no-passing region. The relative distance between the host vehicle and the oncoming vehicle, the velocity of the host vehicle, and the velocity of the oncoming vehicle are detected by the sensor 11.

The first score calculation unit 23 calculates a first score in accordance with a velocity of the oncoming vehicle when the passing position calculation unit 22 determines that the passing position is present within the no-passing region. The first score may be calculated regardless of the determination of whether the passing position is present within the no-passing region made by the passing position calculation unit 22.

The second score calculation unit 24 calculates a second score in accordance with the acceleration rate of the oncoming vehicle when the passing position calculation unit 22 determines that the passing position is present within the no-passing region. The second score may be calculated regardless of the determination of whether the passing position is present within the no-passing region made by the passing position calculation unit 22.

The integration score calculation unit 25 integrates the first score calculated by the first score calculation unit 23 with the second score calculated by the second score calculation unit 24 so as to calculate an integration score. The term "integration" as used in the present embodiment refers to an addition.

The velocity determination unit 26 estimates an intention of the driver of the oncoming vehicle by use of the integration score when the passing position calculation unit 22 determines that the passing position is present within the no-passing region. The velocity determination unit 26 then determines the velocity of the host vehicle in accordance with the estimated intention. The present embodiment is described below on the presumption that the oncoming vehicle is operated by the manual driving made by the driver, but is not limited to this case. The oncoming vehicle can be an automated driving vehicle. When the oncoming vehicle is operated by the automated driving, the intention estimated by the velocity determination unit 26 corresponds to an action expected by a driving control device mounted on the oncoming vehicle. The velocity determination unit 26 may estimate the intention of the driver of the oncoming vehicle in accordance with the integration score regardless of the determination of whether the passing position is present within the no-passing region made by the passing position calculation unit 22.

The vehicle control unit 27 controls the actuator 30 so as to cause the host vehicle to travel at the velocity determined by the velocity determination unit 26. The actuator 30 include a brake actuator, an accelerator pedal actuator, and a steering actuator.

Figure 2:
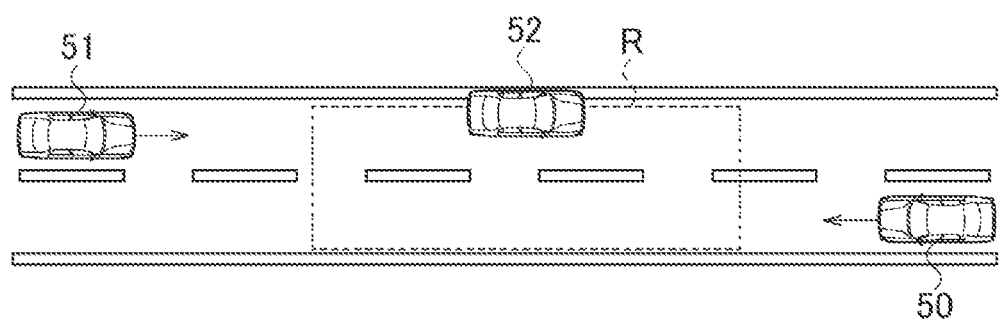
FIG. 2 is a view explaining a no-passing region R according to the embodiment of the present invention.

The no-passing region set by the no-passing region setting unit 21 is described below with reference to FIG. 2. FIG. 2 illustrates a road with one lane in each direction. FIG. 2 illustrates the case in which the host vehicle 50 is traveling toward the left, and the oncoming vehicle 51 is traveling toward the right. The traveling direction of the host vehicle 50 is opposite to the traveling direction of the oncoming vehicle 51. The lane in which the host vehicle 50 is traveling is herein referred to as a traveling lane, and the lane in which the oncoming vehicle 51 is traveling is herein referred to as an oncoming lane. The oncoming lane is located next to the traveling lane.

In the situation illustrated in FIG. 2, the parked vehicle 52 and the oncoming vehicle 51 are presumed to have been detected by the sensor 11. In particular, the positional information and the velocity of the parked vehicle 52 and the positional information and the velocity of the oncoming vehicle 51 are presumed to have been detected by the sensor 11. The positional information of the parked vehicle 52 and the positional information of the oncoming vehicle 51 are detected by a laser rangefinder (a first sensor, a third sensor), for example. The laser rangefinder emits radio waves to scan the objects (the parked vehicle 52 and the oncoming vehicle 51 in this case), and measures the reflected radio waves so as to acquire the distance and the direction to the respective objects. The position of the parked vehicle 52 and the position of the oncoming vehicle 51 each may be detected as a relative position with respect to the position of the host vehicle 50, or may be detected as a position on the coordinates based on the position of the host vehicle 50 as the origin.

The velocity of the parked vehicle 52 and the velocity of the oncoming vehicle 51 are detected by a camera, for example. A difference between a current image captured by the camera and an image of the immediately previous frame is extracted, so as to acquire the velocity of the parked vehicle 52 and the velocity of the oncoming vehicle 51. A frame rate of the camera can be, but not necessarily, set to either 30 frames per second (fps) or 60 fps. The parked vehicle 52 in the present embodiment is determined to be a stationary object, since the velocity of the parked vehicle 52 is detected to be zero. Namely, the object detected around the host vehicle 50 is determined to be a stationary object when the velocity of the object is zero or is a quite low velocity so as to be presumed to be approximately zero. While the present embodiment illustrates the parked vehicle 52 as a stationary object, the stationary object is not limited to the parked vehicle 52. Examples of stationary objects include a fallen object and a pylon (also called a road cone). The parked vehicle 52 is located in the oncoming lane.

As illustrated in FIG. 2, the no-passing region setting unit 21 sets the no-passing region R including the parked vehicle 52 on the road defined within a predetermined region along the extending direction of the road. The shape of the no-passing region R can be determined as appropriate, and may be rectangular, for example. The reason for setting the no-passing region R is to prevent the occupant from feeling uncomfortable because of a close approach of the oncoming vehicle 51 to the host vehicle 50 when the oncoming vehicle 51 avoids the parked vehicle 52 to pass the host vehicle 50. The parked vehicle 52 in this case is thus present in the no-passing region R.

Figure 3:
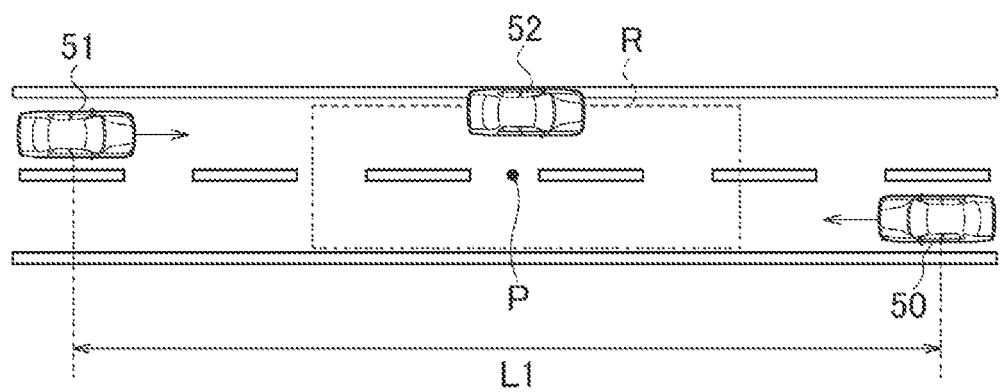
FIG. 3 is a view explaining a passing position P according to the embodiment of the present invention.

After the no-passing region R is set by the no-passing region setting unit 21, the passing position calculation unit 22 determines whether the position at which the host vehicle 50 and the oncoming vehicle 51 pass each other is present within the no-passing region R. In particular, as illustrated in FIG. 3, the passing position calculation unit 22 calculates a position P at which the host vehicle 50 and the oncoming vehicle 51 pass each other in accordance with a relative distance L1 between the host vehicle 50 and the oncoming vehicle 51 (a distance from the position of the host vehicle 50 when defined as the origin), a velocity V1 of the host vehicle 50, and a velocity V2 of the oncoming vehicle 51. The passing position P is calculated by the following equation (1):

$$P = L1/(1 + V2/V1) \qquad (1)$$

The passing position calculation unit 22 determines whether the calculated passing position P is present within the no-passing region R. FIG. 3 illustrates the case in which the passing position P is present within the no-passing region R.

When the passing position calculation unit 22 determines that the passing position P is present within the no-passing region R, as illustrated in FIG. 3, the first score calculation unit 23 calculates the first score in accordance with the velocity of the oncoming vehicle 51. In particular, the first score calculation unit 23 calculates the first score that is a larger value as the velocity of the oncoming vehicle 51 is greater. An example of the first score is described below with reference to FIG. 4.

Figure 4:
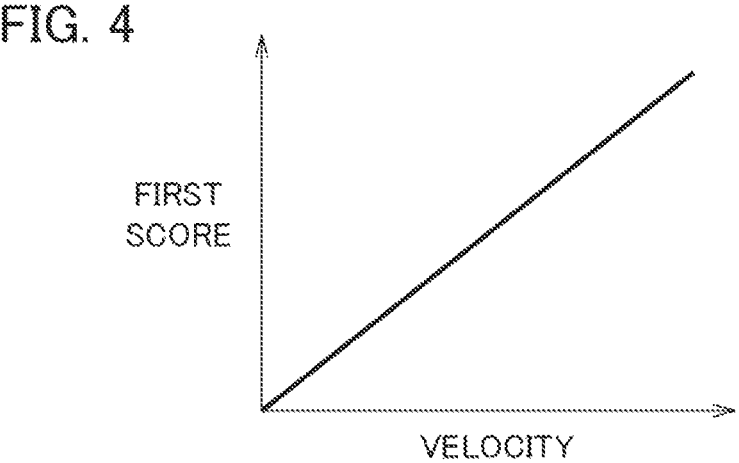
FIG. 4 is a graph explaining a relation between a velocity of an oncoming vehicle and a first score.

FIG. 4 indicates the velocity of the oncoming vehicle 51 on the axis of abscissas, and indicates the first score on the axis of ordinates. The first score is proportional to the velocity of the oncoming vehicle 51. The first score is not limited to a particular value, and may be an optional value determined as appropriate. The first score $s_1$ is given by the following equation (2):

$$s_1 = f_1(v_t) \qquad (2)$$

where $v_t$ is the velocity of the oncoming vehicle 51, and $f_1$ is a function for normalization.

When the passing position calculation unit 22 determines that the passing position P is present within the no-passing region R, as illustrated in FIG. 3, the second score calculation unit 24 calculates the second score in accordance with the velocity of the oncoming vehicle 51. In particular, the second score calculation unit 24 calculates the second score that is a larger value as the acceleration rate of the oncoming vehicle 51 is greater. An example of the second score is described below with reference to FIG. 5.

Figure 5:
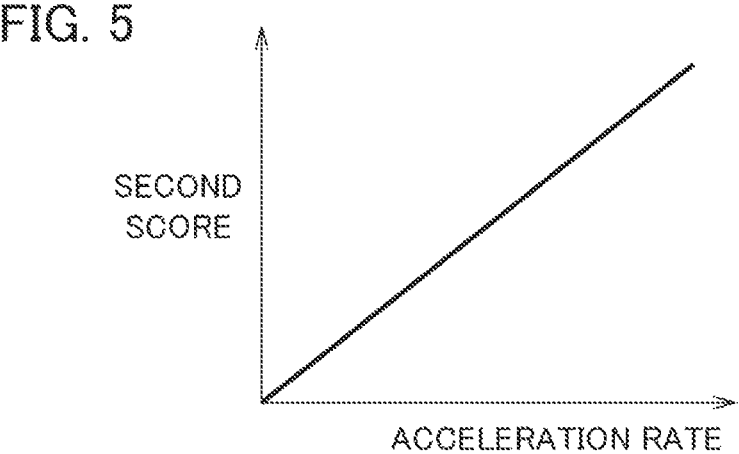
FIG. 5 is a graph explaining a relation between an acceleration rate of the oncoming vehicle and a second score.

FIG. 5 indicates the acceleration rate of the oncoming vehicle 51 on the axis of abscissas, and indicates the second score on the axis of ordinates. The second score is proportional to the acceleration rate of the oncoming vehicle 51. The second score is also not limited to a particular value, and may be an optional value determined as appropriate as in the case of the first score. The second score $s_2$ is given by the following equation (3):

$$s_2 = f_2(a_t) \quad (3)$$

where $a_t$ is the acceleration rate of the oncoming vehicle 51, and $f_2$ is a function for normalization as in the case of the function $f_1$.

The integration score calculation unit 25 integrates the first score $s_1$ calculated by the first score calculation unit 23 with the second score $s_2$ calculated by the second score calculation unit 24 so as to calculate the integration score. The integration score s is given by the following equation (4):

$$s = s_1 + s_2 \quad (4)$$

The velocity determination unit 26 estimates the intention of the driver of the oncoming vehicle 51 in accordance with the integration score calculated by the integration score calculation unit 25 so as to determine the velocity of the host vehicle 50. In the situation illustrated in FIG. 2, two cases are presumed as the intention of the driver of the oncoming vehicle 51. One of the intentions is a case in which the oncoming vehicle 51 passes by the parked vehicle 52 before the host vehicle 50 passes the parked vehicle 52, and the other is a case in which the oncoming vehicle 51 passes by the parked vehicle 52 after the host vehicle 50 passes the parked vehicle 52. Namely, the intention of the driver of the oncoming vehicle 51 to be determined is whether to wait for the host vehicle 50 to pass the parked vehicle 52 or not.

The reason for estimating the intention of the driver of the oncoming vehicle 51 is that the host vehicle 50 can avoid sudden braking or unnecessary acceleration or deceleration when the velocity of the host vehicle 50 is determined in accordance with the estimated intention of the driver of the oncoming vehicle 51. For example, when the intention of the driver of the oncoming vehicle 51 is to wait for the host vehicle 50 to pass the parked vehicle 25, the host vehicle 50 can be led to keep the velocity or accelerate so as to pass the parked vehicle 52 first. When the intention of the driver of the oncoming vehicle 51 is to pass by the parked vehicle 52 without waiting for the host vehicle 50, the host vehicle 50 can be led to decelerate so as to smoothly stop at a position (at a position on the outside of the no-passing region R) at which the host vehicle 50 can prevent a close approach to the oncoming vehicle 51 that could project toward the traveling lane so as to avoid the parked vehicle 52.

If the intention of the driver of the oncoming vehicle 51 is not estimated, the host vehicle 50 may be caused to make sudden braking or unnecessary acceleration or deceleration. For example, when a blocked area caused by the parked vehicle 52 is large, or when there is a pedestrian crossing around the parked vehicle 52, the oncoming vehicle 51 would accelerate to pass by the parked vehicle 52 after briefly decelerating or making a stop for safety. In such a case, the host vehicle 50 first starts accelerating, since the passing position P is temporarily shifted toward the oncoming vehicle 51 due to the deceleration of the oncoming vehicle 51. The host vehicle 50, however, soon needs to decelerate because the oncoming vehicle 51 again accelerates and the passing position P is then shifted toward the host vehicle 50. Namely, the case in which the oncoming vehicle 51 passes by the parked vehicle 52 before the host vehicle 50 includes the case in which the oncoming vehicle 51 first decelerates and then starts accelerating to pass by the parked vehicle 52. However, the acceleration/deceleration control for the host vehicle 50 in such a case is inevitably switched if the intention of the driver of the oncoming vehicle 51 is not estimated, which may lead the host vehicle 50 to make sudden braking or unnecessary acceleration or deceleration accordingly. The present embodiment estimates the intention of the driver of the oncoming vehicle 51 to determine the velocity of the host vehicle 50, so as to avoid sudden braking or unnecessary acceleration or deceleration.

A method of estimating the intention of the driver of the oncoming vehicle 51 by use of the integration score is described below. When the integration score is greater than or equal to a predetermined value, the velocity determination unit 26 estimates that the intention of the driver of the oncoming vehicle 51 is to pass by the parked vehicle 52 without waiting for the host vehicle 50. The velocity determination unit 26 in this case determines the deceleration rate of the host vehicle 50 so as to lead the host vehicle 50 to smoothly stop at a position enabling the host vehicle 50 to avoid a close approach to the oncoming vehicle 51 (at a position on the outside of the no-passing region R).

When the integration score is smaller than the predetermined value, the velocity determination unit 26 estimates that the intention of the driver of the oncoming vehicle 51 is to wait for the host vehicle 50 to pass the parked vehicle 52. The velocity determination unit 26 in this case determines to cause the host vehicle 50 to keep the current velocity or accelerate so as to lead the host vehicle 50 to pass the parked vehicle 52 before the oncoming vehicle 51. The predetermined value can be obtained through experiments or simulations. The predetermined value may be changed depending on the driver. The intention of the driver can be estimated with a high accuracy when the predetermined value is changed depending on the driver because the driving state varies depending on the driver's characteristics and preference.

After the velocity of the host vehicle 50 is determined by the velocity determination unit 26, the vehicle control unit 27 controls the respective actuators 30 (such as the brake actuator, the accelerator pedal actuator, and the steering actuator) so as to lead the host vehicle 50 to travel at the determined velocity. In particular, when the integration score is larger than or equal to the predetermined value, the vehicle control unit 27 decelerates the host vehicle 50 at the deceleration rate determined by the velocity determination unit 26 so as to lead the host vehicle 50 to smoothly stop at the position on the outside of the no-passing region R. When the integration score is smaller than the predetermined value, the vehicle control unit 27 leads the host vehicle 50 to keep the current velocity or accelerate at the acceleration rate determined by the velocity determination unit 26. The vehicle control unit 27 in this case gradually accelerates the host vehicle 50 so that the passing position P is shifted to the outside of the no-passing region R. The vehicle control device 1 according to the present embodiment estimates the intention of the driver of the oncoming vehicle 51 by use of the integration score, and determines the velocity of the host vehicle 50 based on the estimated intention. The vehicle control device 1 thus can avoid sudden braking or unnecessary acceleration or deceleration accordingly.

Figure 6:
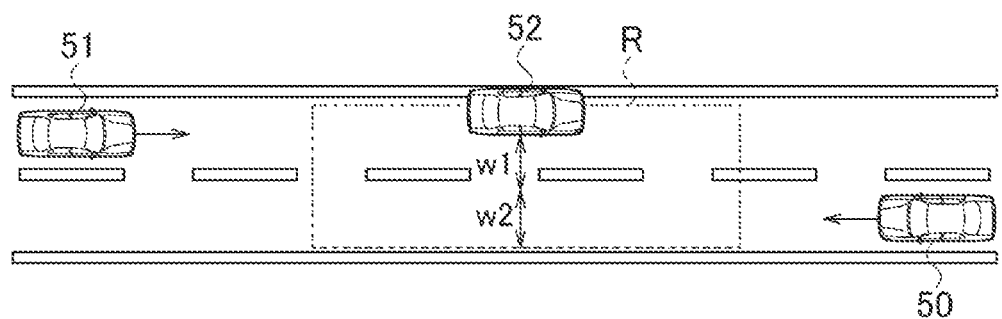
FIG. 6 is a view explaining a case of passing in a narrow road according to the embodiment of the present invention.

The cases illustrated above are each presumed as a situation in which neither the host vehicle 50 nor the oncoming vehicle 51 can pass by the parked vehicle 52 simultaneously, or a situation in which the host vehicle 50 and the oncoming vehicle 51 could pass by the parked vehicle 52 simultaneously but should avoid the simultaneous passing because there is a probability of causing the occupant to feel uncomfortable because of a close approach between the host vehicle 50 and the oncoming vehicle 51. The host vehicle 50 and the oncoming vehicle 51 could safely pass by the parked vehicle 52 simultaneously without causing the occupant to feel uncomfortable depending on the road width, the vehicle width of the parked vehicle 52, the vehicle width of the host vehicle 50, and the vehicle width of the oncoming vehicle 51. The conditions for enabling the host vehicle 50 and the oncoming vehicle 51 to safely pass by the parked vehicle 52 simultaneously without causing the occupant to feel uncomfortable require a space sufficient to ensure a distance between the oncoming vehicle 51 and the parked vehicle 52 and a space sufficient to ensure a distance between the host vehicle 50 and the oncoming vehicle 51. This point is described in detail below with reference to FIG. 6. The sensor 11 detects a width W1 sufficient for the oncoming vehicle 51 to keep traveling while avoiding the parked vehicle 52, as illustrated in FIG. 6. The width W1 can be obtained such that the vehicle width of the oncoming vehicle 51 is added to the space sufficient to avoid a close approach of the oncoming vehicle 51 to the parked vehicle 52. The sensor 11 then detects a remaining lane width W2 obtained such that the vehicle width of the parked vehicle 52 (the vehicle width overlapping with the road) and the width W1 are subtracted from the entire road width. The passing position calculation unit 22 determines whether the remaining lane width W2 is sufficient to prevent the occupant from feeling uncomfortable when the host vehicle 50 and the oncoming vehicle 51 pass each other. When the remaining lane width W2 is sufficient to prevent the occupant from feeling uncomfortable when the host vehicle 50 and the oncoming vehicle 51 pass each other, the host vehicle 50 and the oncoming vehicle 51 each can decelerate so as to pass each other in the narrow road.

Figure 7B:
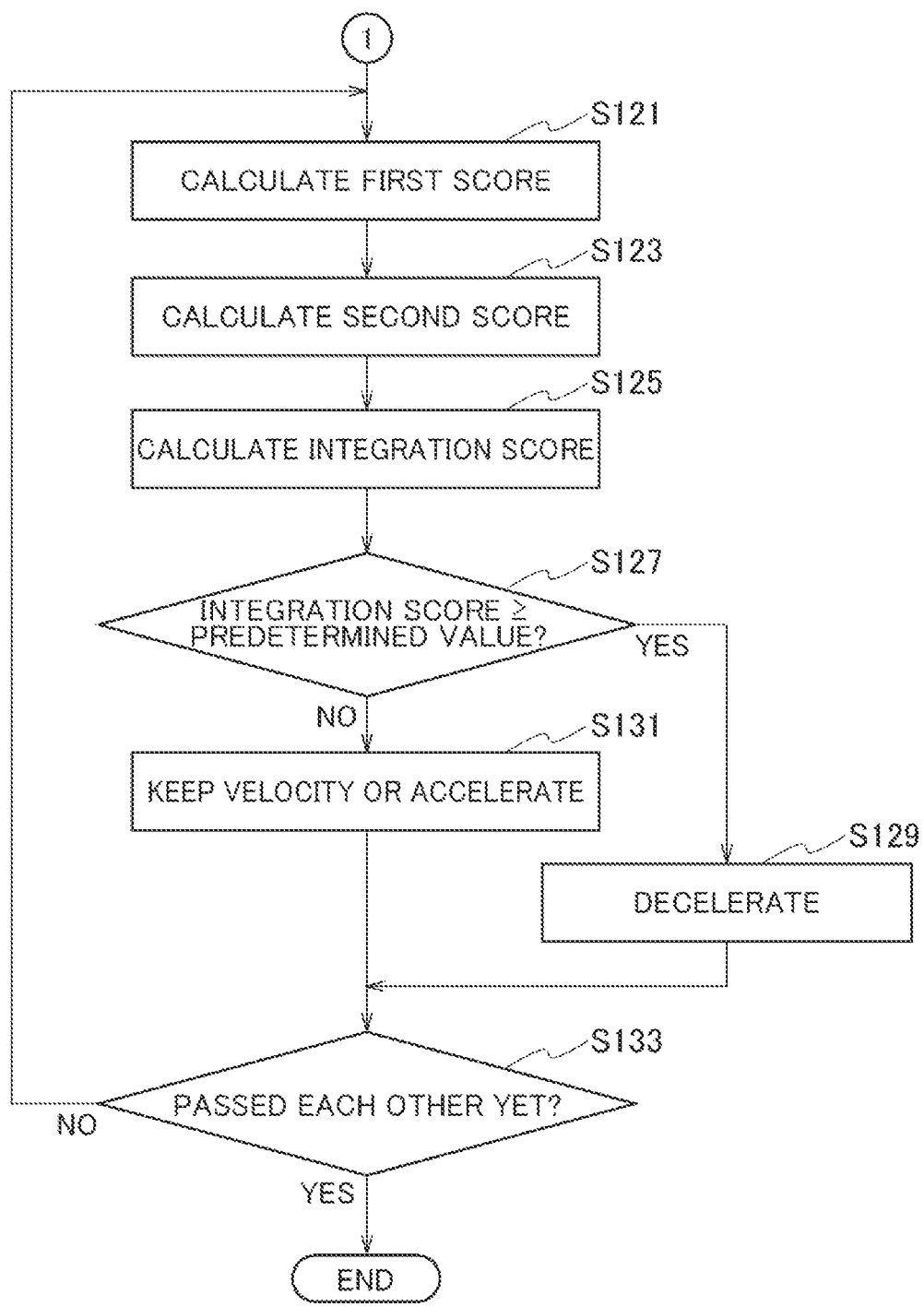
FIG. 7B is a flowchart explaining the example of operation of the vehicle control device 1 according to the embodiment of the present invention.

An example of operation of the vehicle control device 1 is described below with reference to the flowcharts shown in FIG. 7A to FIG. 7B. The process described below is repeated on a predetermined cycle.

In step S101, the controller 20 acquires the map information from the map database 12. The process proceeds to step S103, and the GPS receiver 10 detects the positional information of the host vehicle 50.

When the parked vehicle 52 and the oncoming vehicle 51 are detected by the sensor 11 (YES in step S105), the process proceeds to step S107. When either the parked vehicle 52 or the oncoming vehicle 51 is not detected (NO in step S105), the series of processing ends.

In step S107, the no-passing region setting unit 21 sets the no-passing region R including the parked vehicle 52 on the road defined within a predetermined region along the extending direction of the road (refer to FIG. 2). The process proceeds to step S109, and the passing position calculation unit 22 determines whether the position P at which the host vehicle 50 and the oncoming vehicle 51 pass each other is present within the no-passing region R set in step S107.

When the position P at which the host vehicle 50 and the oncoming vehicle 51 pass each other is present within the no-passing region R (YES in step S111), the process proceeds to step S113. When the position P at which the host vehicle 50 and the oncoming vehicle 51 pass each other is not present within the no-passing region R (NO in step S111), the process proceeds to step 5119.

In step S113, the sensor 11 detects the width W1 sufficient for the oncoming vehicle 51 to keep traveling while avoiding the parked vehicle 52 (refer to FIG. 6). The sensor 11 then detects the remaining lane width W2 obtained such that the vehicle width of the parked vehicle 52 and the width W1 are subtracted from the entire road width (refer to FIG. 6). The process proceeds to step S115, and the passing position calculation unit 22 determines whether the remaining lane width W2 detected in step S113 is sufficient to avoid a close approach between the host vehicle 50 and the oncoming vehicle 51 when passing each other. When the result of the determination is YES in step S115, the process proceeds to step S117, and the host vehicle 50 is caused to keep traveling to pass the oncoming vehicle 51 in the narrow road. When the host vehicle 50 and the oncoming vehicle 51 have passed each other (YES in step S119), the series of processing ends. When the result of the determination is NO in step S115, the process proceeds to step S121.

In step S121, the first score calculation unit 23 calculates the first score that is a larger value as the velocity of the oncoming vehicle 51 is greater (refer to FIG. 4). The process proceeds to step S123, and the second score calculation unit 24 calculates the second score that is a larger value as the velocity of the oncoming vehicle 51 is greater (refer to FIG. 5). The process proceeds to step S125, and the integration score calculation unit 25 integrates the first score calculated in step S121 with the second score calculated in step S123 so as to calculate the integration score.

When the integration score is greater than or equal to the predetermined value (YES in step S127), the process proceeds to step S129, and the velocity determination unit 26 estimates that the intention of the driver of the oncoming vehicle 51 is to pass by the parked vehicle 52 without waiting for the host vehicle 50. The velocity determination unit 26 then determines the deceleration rate of the host vehicle 50 so as to smoothly stop at a position at which the host vehicle 50 can avoid a close approach to the oncoming vehicle 51 (at a position on the outside of the no-passing region R). The vehicle control unit 27 decelerates the host vehicle 50 at the deceleration rate determined by the velocity determination unit 26 so as to lead the host vehicle 50 to smoothly stop at the position on the outside of the no-passing region R.

When the integration score is less than the predetermined value (NO in step S127), the process proceeds to step S131, and the velocity determination unit 26 estimates that the intention of the driver of the oncoming vehicle 51 is to wait for the host vehicle 50 to pass the parked vehicle 52. The velocity determination unit 26 then determines to cause the host vehicle 50 to keep the current velocity or accelerate. The vehicle control unit 27 causes the host vehicle 50 to keep the current velocity or accelerate at the acceleration rate determined by the velocity determination unit 26. The processing in step S133 is the same as that in step S119, and overlapping explanations are not repeated below.

In the example described above, the passing position calculation unit 22 determines whether the remaining lane width W2 is sufficient for the host vehicle 50 to pass when the passing position P at which the host vehicle 50 and the oncoming vehicle 51 pass each other is present within the no-passing region R (YES in step S111). While the first score, the second score, and the integration score are calculated as described above (in step S121, step S123, and step S125) when the remaining lane width W2 is determined not to be sufficient (NO in step S115), the present embodiment is not limited to this case. For example, the first score, the second score, and the integration score may be constantly calculated regardless of the determinations made in step S111 and step S115. Alternatively, the process may proceed to step S127 in accordance with the determination results in step S111 and step S115 so as to determine whether the integration score is greater than or equal to the predetermined value. Alternatively, the processing in steps S113 to S117 may be omitted, and the controller 20 may constantly lead the process to proceed to step S127 when the passing position P is present within the no-passing region R (YES in step S111) so as to determine whether the integration score is greater than or equal to the predetermined value.

<Operational Effects>

As described above, the vehicle control device 1 according to the present embodiment can achieve the following operational effects.

The vehicle control device 1 detects the stationary object (such as the parked vehicle 52) on the road on which the host vehicle 50 is traveling. The vehicle control device 1 detects the velocity of the host vehicle 50. The vehicle control device 1 detects the position and the velocity of the oncoming vehicle 51 traveling in the direction opposite to the traveling direction of the host vehicle 50 in the oncoming lane adjacent to the traveling lane in which the host vehicle 50 is traveling. The vehicle control device 1 sets the region (the no-passing region R) including the parked vehicle 52 on the road defined along the extending direction of the road.

The vehicle control device 1 calculates the position at which the host vehicle 50 and the oncoming vehicle 51 pass each other in accordance with the velocity of the host vehicle 50 and the position and the velocity of the oncoming vehicle 51. The vehicle control device 1 calculates the first score s1 that is a larger value as the velocity of the oncoming vehicle 51 is greater. The vehicle control device 1 calculates the second score $s_2$ that is a larger value as the acceleration rate of the oncoming vehicle 51 is greater. The vehicle control device 1 integrates the first score $s_1$ and the second score $s_2$ to calculate the integration score s. The vehicle control device 1 causes the host vehicle 50 to decelerate when the integration score s is greater than or equal to the predetermined value or causes the host vehicle 50 to keep the current velocity or accelerate when the integration score s is smaller than the predetermined value in the case in which the passing position is present within the region.

As described above, the vehicle control device 1 estimates the intention of the driver of the oncoming vehicle 51 in accordance with the integration score s, and determines the velocity of the host vehicle 50 based on the estimated intention. The vehicle control device 1 thus can avoid sudden braking or unnecessary acceleration or deceleration.

While the first score calculation unit 23 and the second score calculation unit 24 can calculate the first score and the second score regardless of the determination of whether the passing position P is present within the no-passing region R made by the passing position calculation unit 22, the first score and the second score are preferably calculated only when the passing position P is determined to be present within the no-passing region R. This reduces a load of the calculation as compared with the case of constantly calculating the first score and the second score.

Modified Example 1

Next, modified example 1 of the present embodiment is described below.

In the modified example 1, the second score calculation unit 24 multiplies the second score by a first weight $\omega_1$ that is a larger value as the oncoming vehicle 51 is coming closer to the parked vehicle 52. The first weight $\omega_1$ is described below with reference to FIG. 8.

Figure 8:
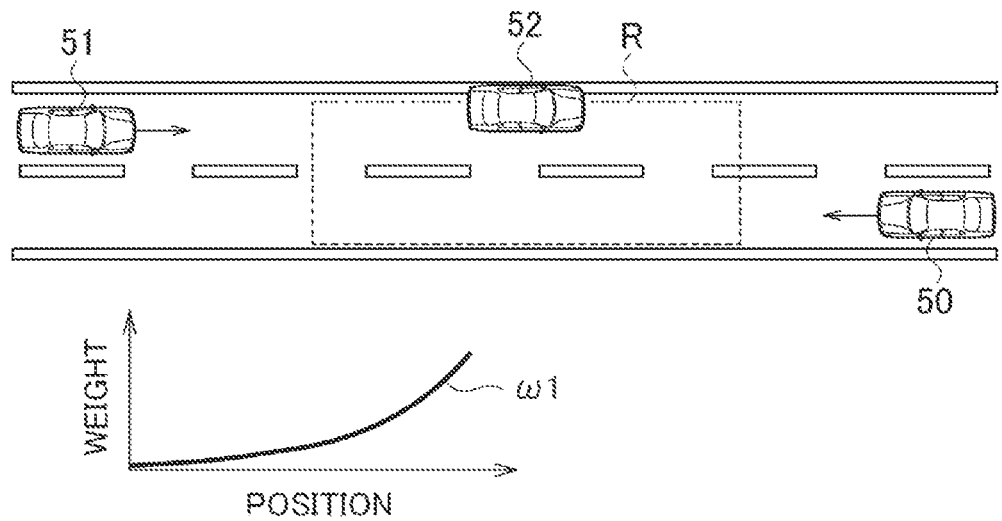
FIG. 8 is a view explaining a weight by which the second score is multiplied.

The position indicated on the axis of abscissas in the graph shown in FIG. 8 corresponds to the position of the oncoming vehicle 51 with respect to the parked vehicle 52. The axis of abscissas in the graph shown in FIG. 8 indicates that the position of the oncoming vehicle 51 is closer to the parked vehicle 52 as the graph moves toward the right. The position of the graph on the axis of abscissas moves toward the right as the oncoming vehicle 51 is coming closer to the parked vehicle 52. The axis of ordinates in the graph indicates the first weight $\omega_1$. As shown in FIG. 8, the first weight $\omega_1$ is larger as the oncoming vehicle 51 is coming closer to the parked vehicle 52. The integration score s when the second score $s_2$ is multiplied by the first weight $\omega_1$ is given by the following equation (5):

$$s = s_1 + s_2 \omega_1 \qquad (5)$$

The object of multiplying the second score by the first weight $\omega_1$ is described below. In the case of estimating the intention of the driver of the oncoming vehicle 51, the acceleration rate of the oncoming vehicle 51 has a larger influence on the estimation accuracy than the velocity, which depends on the position of the oncoming vehicle 51. In addition, the acceleration rate of the oncoming vehicle 51 to be used has a larger influence on the estimation accuracy at the position closer to the parked vehicle 52 than at the position away from the parked vehicle 52. This is because the probability that the driver of the oncoming vehicle 51 intends to pass by the parked vehicle 52 without waiting for the host vehicle 50 is increased when the acceleration rate of the oncoming vehicle 51 is increased at a position close to the parked vehicle 52. The second score calculation unit 24 thus multiplies the second score by the first weight Wi that is a larger value as the oncoming vehicle 51 is coming closer to the parked vehicle 52. This multiplication increases the contribution of the second score to the integration score when the oncoming vehicle 51 is located at a position close to the parked vehicle 52. The use of the integration score calculated as described above can estimate the intention of the driver of the oncoming vehicle 51 with a high accuracy.

The first weight Wi is a small value when the oncoming vehicle 51 is located at a position away from the parked vehicle 52. Multiplying the second score by the first weight $\omega_1$ decreases the contribution of the second score to the integration score when the oncoming vehicle 51 is located at a position away from the parked vehicle 52. Multiplying the second score by the first weight $\omega_1$ thus can control the contribution of the second score to the integration score.

As shown in FIG. 8, the increase rate of the first weight $\omega_1$ with respect to the change in distance in the direction in which the oncoming vehicle 51 comes close to the parked vehicle 52 increases as the oncoming vehicle 51 is coming closer to the parked vehicle 52. As described above, the acceleration rate of the oncoming vehicle has a larger influence on the estimation accuracy at the position closer to the parked vehicle 52 than at the position away from the parked vehicle 52. The modified example 1 sets the increase rate of the first weight $\omega_1$ to be larger as the oncoming vehicle 51 is coming closer to the parked vehicle 52. The contribution of the second score to the integration score thus increases as the oncoming vehicle 51 is located closer to the parked vehicle 52. The use of the integration score as described above can estimate the intention of the driver of the oncoming vehicle 51 with a high accuracy.

The controller 20 may set the first weight $\omega_1$ by a method described below. The controller 20 may preliminarily store, in the map and the like, the first weight $\omega_1$ corresponding to the position of the oncoming vehicle 51 with respect to the parked vehicle 52 (namely, the distance between the parked vehicle 52 and the oncoming vehicle 51), and refer to the position of the oncoming vehicle 51 with respect to the parked vehicle 52 detected by the sensor 11 and the map so as to set the first weight $\omega_1$.

Modified Example 2

Next, modified example 2 of the present embodiment is described below.

The modified example 1 is illustrated above with the case in which the second score calculation unit 24 multiplies the second score by the first weight $\omega_1$. In addition to this, in the modified example 2, the first score calculation unit 23 multiplies the first score by a second weight $\omega_2$ that is a smaller value as the oncoming vehicle 51 is coming closer to the parked vehicle 52. The second weight $\omega_2$ is described below with reference to FIG. 9.

Figure 9:
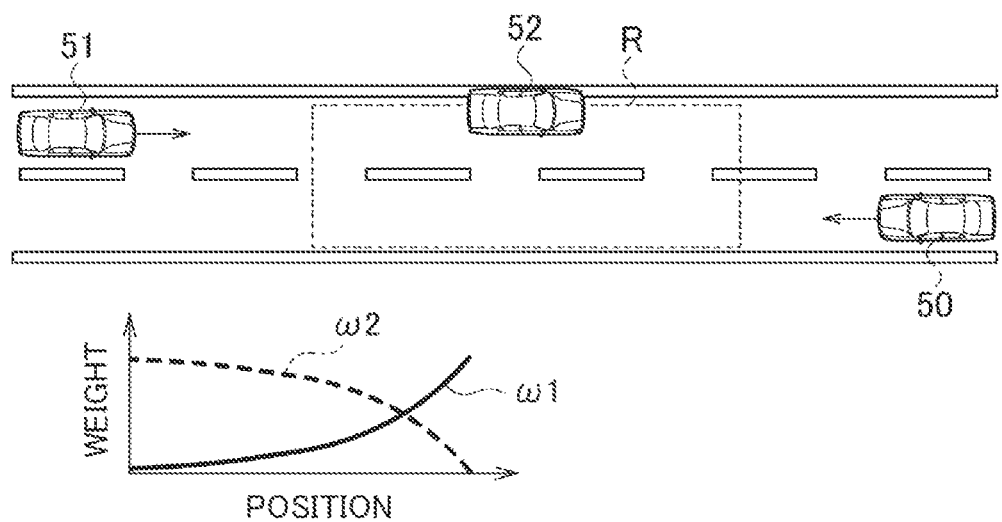
FIG. 9 is a view explaining weights by which the first score and the second score are multiplied.

The position indicated on the axis of abscissas in the graph shown in FIG. 9 corresponds to the position of the oncoming vehicle 51 with respect to the parked vehicle 52, as in the case of FIG. 8. The axis of abscissas in the graph shown in FIG. 9 indicates that the position of the oncoming vehicle 51 is closer to the parked vehicle 52 as the graph moves toward the right, as in the case of FIG. 8. The position of the graph on the axis of abscissas moves toward the right as the oncoming vehicle 51 is coming closer to the parked vehicle 52. The axis of ordinates in the graph indicates the first weight $\omega_1$ and the second weight $\omega_2$. As shown in FIG. 9, the second weight $\omega_2$ is a smaller value as the oncoming vehicle 51 is coming closer to the parked vehicle 52. The integration score s when the first score $s_1$ is multiplied by the second weight $\omega_2$ is given by the following equation (6):

$$s = s_1 \omega_2 + s_2 \omega_1 \quad (6)$$

In the modified example 2, the contribution of the second score to the integration score increases when the oncoming vehicle 51 is located at a position closer to the parked vehicle 52, and the contribution of the first score to the integration score increases when the oncoming vehicle 51 is located at a position further from the parked vehicle 52. The vehicle control device 1 according to the modified example 2 thus uses the first weight $\omega_1$ and the second weight $\omega_2$ so as to control the contribution of the first score and the second score to the integration score.

As shown in FIG. 9, the decrease rate of the second weight $\omega_2$ with respect to the change in distance in the direction in which the oncoming vehicle 51 comes close to the parked vehicle 52 increases as the oncoming vehicle 51 is coming closer to the parked vehicle 52. The contribution of the first score to the integration score relatively decreases and the contribution of the second score to the integration score relatively increases as the oncoming vehicle 51 is located at the position closer to the parked vehicle 52. The use of the integration score as described above can estimate the intention of the driver of the oncoming vehicle 51 with a high accuracy.

The second weight $\omega_2$ may be set by the same method as the first weight $\omega_1$. The controller 20 may preliminarily store, in the map and the like, the second weight $\omega_2$ corresponding to the position of the oncoming vehicle 51 with respect to the parked vehicle 52 (namely, the distance between the parked vehicle 52 and the oncoming vehicle 51), and refer to the position of the oncoming vehicle 51 with respect to the parked vehicle 52 detected by the sensor 11 and the map so as to set the second weight $\omega_2$.

The sum of the first weight $\omega_1$ and the second weight $\omega_2$ may be a constant value. Setting one of the first weight $\omega_1$ and the second weight $\omega_2$, when the sum is set to a constant value, can automatically lead to the other one. This can reduce the calculation cost upon the setting of the respective weights as compared with the case in which the first weight $\omega_1$ and the second weight $\omega_2$ are set independently of each other.

Modified Example 3

Next, modified example 3 of the present embodiment is described below.

In the modified example 3, a velocity threshold is set that is a larger value as the distance between the parked vehicle 52 and the oncoming vehicle 51 is longer, and the first score is then calculated in accordance with a difference between the velocity of the oncoming vehicle 51 and the velocity threshold.

Figure 10:
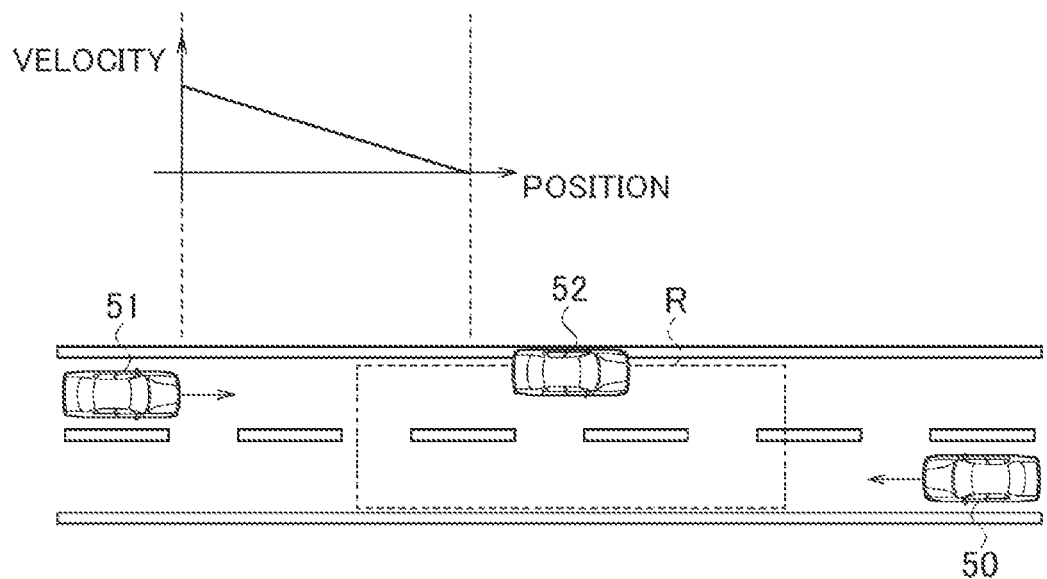
FIG. 10 is a view explaining a velocity threshold according to modified example 3 of the present invention.

The velocity threshold is described below with reference to FIG. 10. As shown in FIG. 10, the controller 20 generates a velocity profile that is presumed to lead the oncoming vehicle 51 to stop in front of the parked vehicle 52 after starting decelerating at a constant deceleration rate from a certain position (which can be the current position) of the oncoming vehicle 51. The velocity regarding the velocity profile is greater as the distance between the parked vehicle 52 and the oncoming vehicle 51 is longer.

Figure 11:
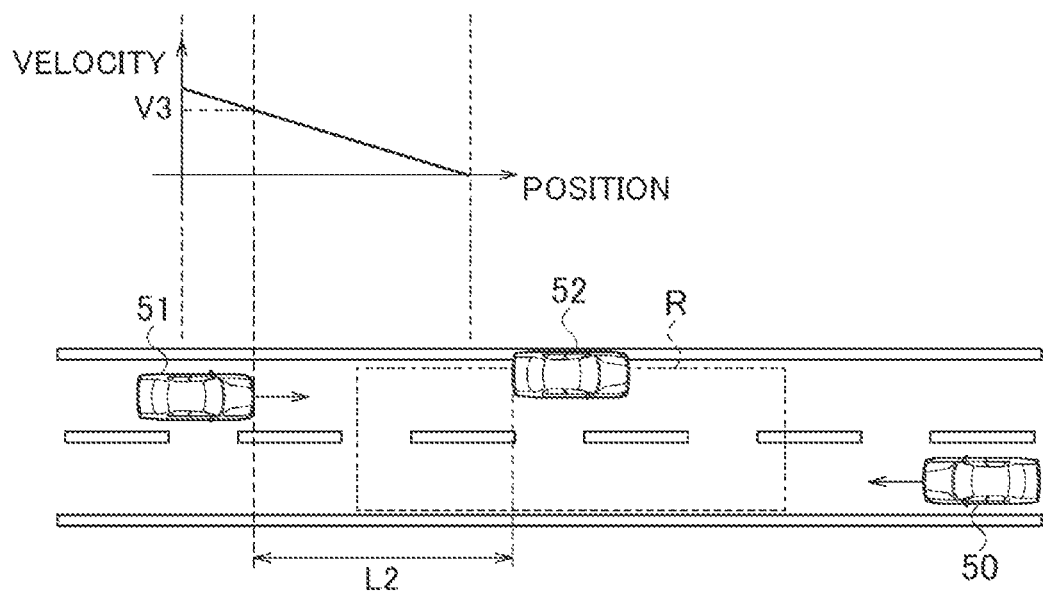
FIG. 11 is a view explaining the velocity threshold according to the modified example 3 of the present invention.
Figure 12:
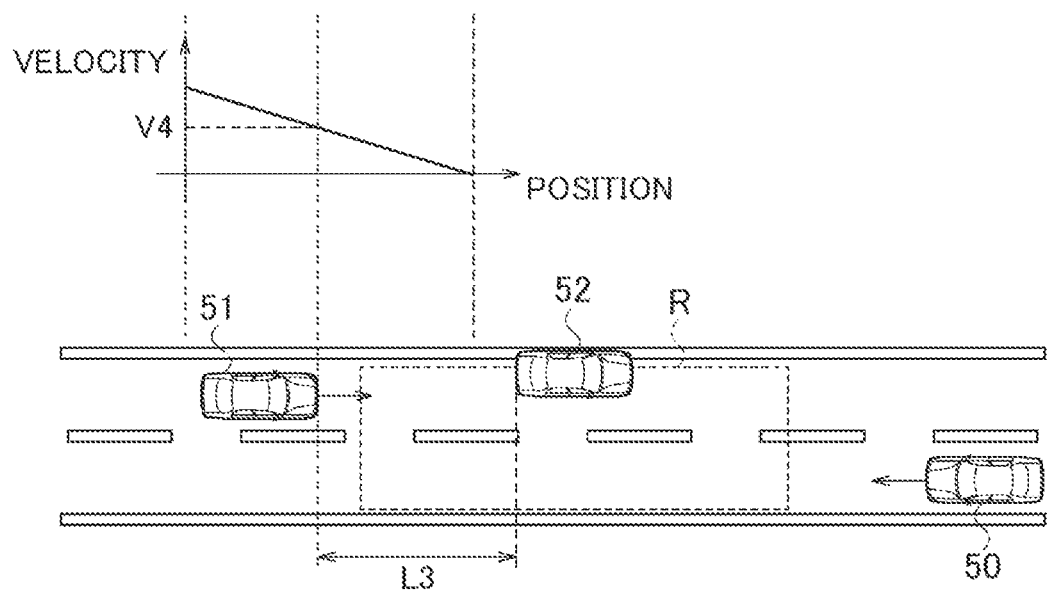
FIG. 12 is a view explaining the velocity threshold according to the modified example 3 of the present invention.

The controller 20 sets the velocity threshold by use of the generated velocity profile. In particular, as illustrated in FIG. 11, the controller 20 sets the velocity regarding the velocity profile as the velocity threshold corresponding to a position of the oncoming vehicle 51 distant from the parked vehicle 52 by a predetermined distance (a distance L2). The set velocity threshold in the example illustrated in FIG. 11 is V3. FIG. 12 illustrates another example in which the controller 20 sets the velocity regarding the velocity profile as the velocity threshold corresponding to a position of the oncoming vehicle 51 distant from the parked vehicle 52 by a predetermined distance (a distance L3). The set velocity threshold in the example illustrated in FIG. 12 is V4. The examples described above satisfy the relations of L2>L3, and V3>V4. The velocity threshold is thus greater as the distance between the parked vehicle 52 and the oncoming vehicle 51 is longer.

The controller 20 calculates a difference between the velocity threshold and the velocity of the oncoming vehicle 51. In the example illustrated in FIG. 11, in the case in which the passing position P is present within the no-passing region R, the controller 20 calculates the difference between the velocity threshold V3 corresponding to the position of the oncoming vehicle 51 distant from the parked vehicle 52 by the distance L2 and the velocity of the oncoming vehicle 51 corresponding to the position of the oncoming vehicle 51 distant from the parked vehicle 52 by the distance L2.

The first score calculation unit 23 calculates the first score that is a larger value as the velocity $v_t$ of the oncoming vehicle 51 corresponding to the position of the oncoming vehicle 51 distant from the parked vehicle 52 by the distance L2 is greater than the velocity threshold V3 corresponding to the position of the oncoming vehicle 51 distant from the parked vehicle 52 by the distance L2. The first score $s_1$ is given by the following equation (7):

$$s_1 = f_1(v_t - v_k) \tag{7}$$

where $v_k$ is a general-purpose velocity threshold.

The probability is high that the driver of the oncoming vehicle 51 tries to pass by the parked vehicle 52 without waiting for the host vehicle 50 when the velocity of the oncoming vehicle 51 is greater than the velocity threshold. Calculating the first score according to the equation (7) to use the calculated first score can estimate the intention of the driver of the oncoming vehicle 51 with a high accuracy. The vehicle control device 1 according to the modified example 3 thus estimates the intention of the driver of the oncoming vehicle 51 by use of the first score calculated in accordance with the difference between the velocity of the oncoming vehicle 51 and the velocity threshold, and determines the velocity of the host vehicle 50 based on the estimated intention. The vehicle control device 1 thus can avoid sudden braking or unnecessary acceleration or deceleration.

Figure 13:
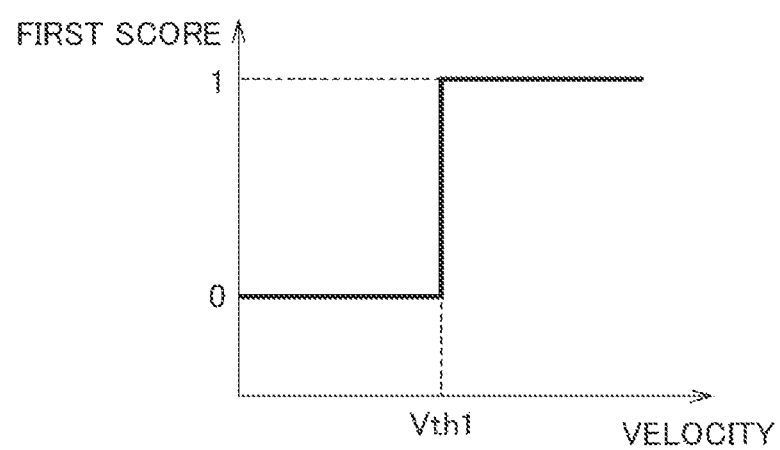
FIG. 13 is a graph explaining a relation between the velocity of the oncoming vehicle and the first score.

Another example of the method of calculating the first score based on the comparison between the velocity of the oncoming vehicle 51 and the velocity threshold is described below with reference to FIG. 13. As shown in FIG. 13, the controller 20 sets the velocity threshold, as a first velocity threshold Vth1, that is a larger value as the distance between the parked vehicle 52 and the oncoming vehicle 51 is longer. The controller 20 then compares the first velocity threshold Vth1 corresponding to the position of the oncoming vehicle 51 distant from the parked vehicle 52 by a predetermined distance with the velocity of the oncoming vehicle 51 corresponding to the position of the oncoming vehicle 51 distant from the parked vehicle 52 by the predetermined distance.

As shown in FIG. 13, when the velocity of the oncoming vehicle 51 is greater than or equal to the first velocity threshold Vth1, the first score calculation unit 23 calculates the first score to be 1. When the velocity of the oncoming vehicle 51 is less than the first velocity threshold Vth1, the first score calculation unit 23 calculates the first score to be 0. The example shown in FIG. 13 is illustrated with the case in which the first score is binarized. As described above, when the velocity of the oncoming vehicle 51 is greater than or equal to the first velocity threshold Vth1, the probability is high that the driver of the oncoming vehicle 51 tries to pass by the parked vehicle 52 without waiting for the host vehicle 50. The calculation of the first score and the use of the calculated first score thus can estimate the intention of the driver of the oncoming vehicle 51 with a high accuracy.

Figure 14:
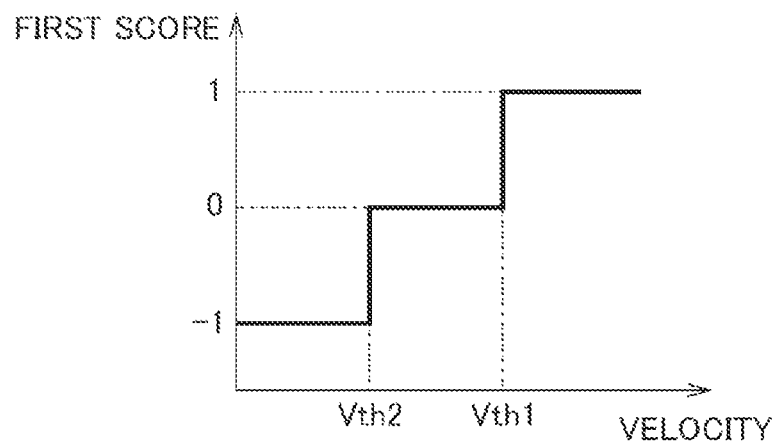
FIG. 14 is a graph explaining the relation between the velocity of the oncoming vehicle and the first score.

The first score may be ternarized. As shown in FIG. 14, the controller 20 may set a second velocity threshold Vth2 smaller than the first velocity threshold Vth1, and compare these thresholds with the velocity of the oncoming vehicle 51. As shown in FIG. 14, when the velocity of the oncoming vehicle 51 is greater than or equal to the first velocity threshold Vth1, the first score calculation unit 23 calculates the first score to be 1. When the velocity of the oncoming vehicle 51 is less than the first velocity threshold Vth1 and greater than or equal to the second velocity threshold Vth2, the first score calculation unit 23 calculates the first score to be 0. When the velocity of the oncoming vehicle 51 is less than the second velocity threshold Vth2, the first score calculation unit 23 calculates the first score to be −1. The probability is high that the driver of the oncoming vehicle 51 waits for the host vehicle 50 to pass by when the velocity of the oncoming vehicle 51 is less than the second velocity threshold Vth2. The calculation of the first score and the use of the calculated first score thus can estimate the intention of the driver of the oncoming vehicle 51 with a high accuracy.

Modified Example 4

Next, modified example 4 of the present embodiment is described below.

In the modified example 4, an acceleration rate threshold is set that is a larger value as the distance between the parked vehicle 52 and the oncoming vehicle 51 is longer, and the second score is then calculated in accordance with a difference between the acceleration rate of the oncoming vehicle 51 and the acceleration rate threshold.

Figure 15:
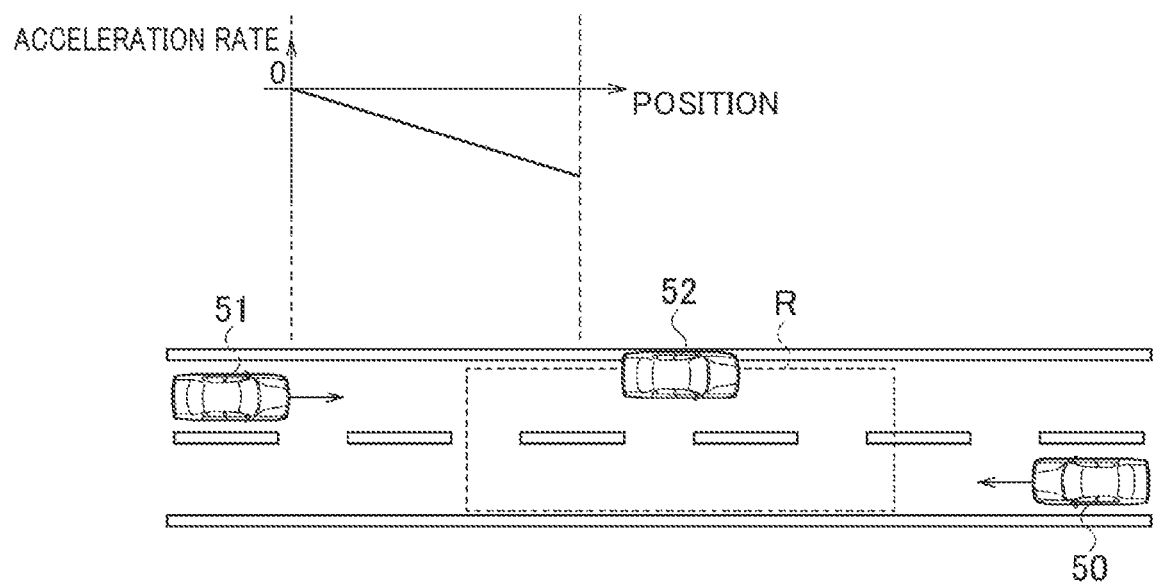
FIG. 15 is a view explaining an acceleration rate threshold according to modified example 4 of the present invention.

The acceleration rate threshold is described below with reference to FIG. 15. As shown in FIG. 15, the controller 20 generates an acceleration rate profile (which is a deceleration rate, and is a negative acceleration profile) presumed to lead the oncoming vehicle 51 to stop in front of the parked vehicle 52 at a certain position (which can be the current position) of the oncoming vehicle 51. The acceleration rate regarding the acceleration rate profile is greater as the distance between the parked vehicle 52 and the oncoming vehicle 51 is longer. The acceleration rate regarding the acceleration rate profile can be obtained through experiments or simulations. The axis of ordinates in the graph shown in FIG. 15 indicates the acceleration rate that is greater as the graph moves in the upper direction that is the positive direction. The acceleration rate in the acceleration rate profile shown in FIG. 15 is the negative acceleration rate (the deceleration rate), and is thus smaller (indicates a greater deceleration rate) as the graph moves in the lower direction. The following explanations are made with a case in which the acceleration rate in the traveling direction of the oncoming vehicle 51 refers to a positive acceleration rate, and the acceleration rate in the direction opposite to the traveling direction of the oncoming vehicle 51 (namely, the deceleration rate) refers to a negative acceleration rate. The phrase "the acceleration rate is large" as used herein refers to a case in which the acceleration rate is large in the positive direction.

The controller 20 sets the acceleration rate threshold by use of the generated acceleration rate profile. A method of setting the acceleration rate threshold is the same as the method of setting the velocity threshold as described above. The controller 20 calculates a difference between the acceleration rate threshold corresponding to the position of the oncoming vehicle 51 distant from the parked vehicle 52 by a predetermined distance and the acceleration rate of the oncoming vehicle 51 corresponding to the position of the oncoming vehicle 51 distant from the parked vehicle 52 by the predetermined distance.

The second score calculation unit 24 calculates the second score that is a larger value as the acceleration rate $a_t$ of the oncoming vehicle 51 corresponding to the position of the oncoming vehicle 51 distant from the parked vehicle 52 by the predetermined distance is greater than the acceleration rate threshold corresponding to the position of the oncoming vehicle 51 distant from the parked vehicle 52 by the predetermined distance. The second score $s_2$ is given by the following equation (8):

$$s2 = f_2(a_t - a_k) \tag{8}$$

where $a_k$ is a general-purpose acceleration rate threshold.

The probability is high that the driver of the oncoming vehicle 51 tries to pass by the parked vehicle 52 without waiting for the host vehicle 50 when the acceleration rate of the oncoming vehicle 51 is greater than the acceleration rate threshold. Calculating the second score according to the equation (8) to use the calculated second score can estimate the intention of the driver of the oncoming vehicle 51 with a high accuracy. The vehicle control device 1 according to the modified example 4 thus estimates the intention of the driver of the oncoming vehicle 51 by use of the second score calculated in accordance with the difference between the acceleration rate of the oncoming vehicle 51 and the acceleration rate threshold, and determines the velocity of the host vehicle 50 based on the estimated intention. The vehicle control device 1 thus can avoid sudden braking or unnecessary acceleration or deceleration.

Figure 16:
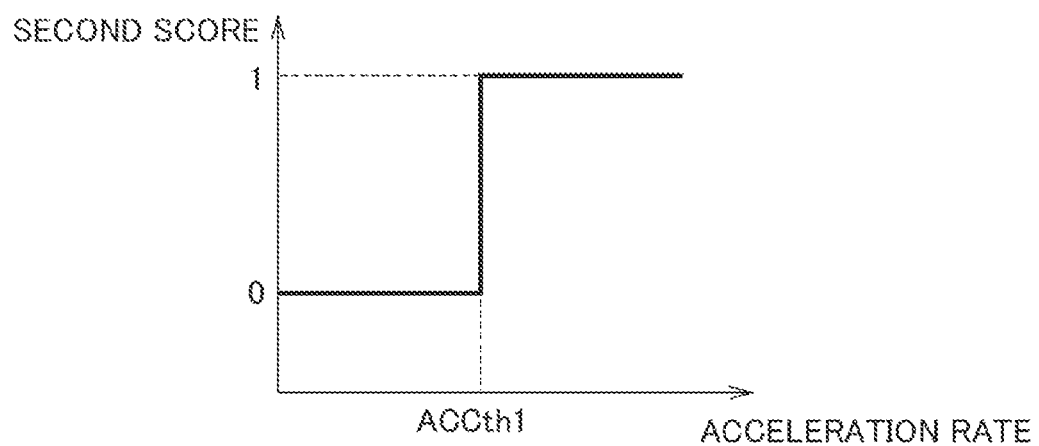
FIG. 16 is a graph explaining a relation between the acceleration rate of the oncoming vehicle and the second score.

Another example of the method of calculating the second score based on the comparison between the acceleration rate of the oncoming vehicle 51 and the acceleration rate threshold is described below with reference to FIG. 16. As shown in FIG. 16, the controller 20 sets the acceleration rate threshold, as a first acceleration rate threshold ACCth1, that is a larger value as the distance between the parked vehicle 52 and the oncoming vehicle 51 is longer. The controller 20 then compares the first acceleration rate threshold ACCth1 corresponding to the position of the oncoming vehicle 51 distant from the parked vehicle 52 by the predetermined distance with the acceleration rate of the oncoming vehicle 51 corresponding to the position of the oncoming vehicle 51 distant from the parked vehicle 52 by the predetermined distance.

As shown in FIG. 16, when the acceleration rate of the oncoming vehicle 51 is greater than or equal to the first acceleration rate threshold ACCth1, the second score calculation unit 24 calculates the second score to be 1. When the acceleration rate of the oncoming vehicle 51 is less than the first acceleration rate threshold ACCth1, the second score calculation unit 24 calculates the second score to be 0. The example shown in FIG. 16 is illustrated with the case in which the second score is binarized. As described above, when the acceleration rate of the oncoming vehicle 51 is greater than or equal to the first acceleration rate threshold ACCth1, the probability is high that the driver of the oncoming vehicle 51 tries to pass by the parked vehicle 52 without waiting for the host vehicle 50. The calculation of the second score and the use of the calculated second score thus can estimate the intention of the driver of the oncoming vehicle 51 with a high accuracy.

Figure 17:
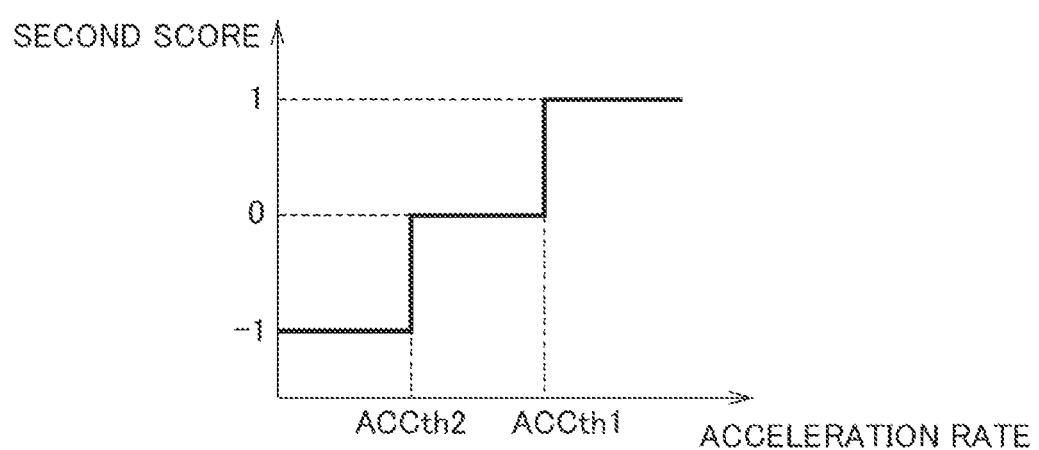
FIG. 17 is a graph explaining the relation between the acceleration rate of the oncoming vehicle and the second score.

The second score may be ternarized. As shown in FIG. 17, the controller 20 may set a second acceleration rate threshold ACCth2 smaller than the first acceleration rate threshold ACCth1, and compare these thresholds with the acceleration rate of the oncoming vehicle 51. As shown in FIG. 17, when the acceleration rate of the oncoming vehicle 51 is greater than or equal to the first acceleration rate threshold ACCth1, the second score calculation unit 24 calculates the second score to be 1. When the acceleration rate of the oncoming vehicle 51 is less than the first acceleration rate threshold ACCth1 and greater than or equal to the second acceleration rate threshold ACCth2, the second score calculation unit 24 calculates the second score to be 0. When the acceleration rate of the oncoming vehicle 51 is less than the second acceleration rate threshold ACCth2, the second score calculation unit 24 calculates the second score to be −1. The probability is high that the driver of the oncoming vehicle 51 waits for the host vehicle 50 to pass by when the acceleration rate of the oncoming vehicle 51 is less than the second acceleration rate threshold ACCth2. The calculation of the second score and the use of the calculated second score thus can estimate the intention of the driver of the oncoming vehicle 51 with a high accuracy.

Modified Example 5

Next, modified example 5 of the present embodiment is described below.

In the modified example 5, a margin is set to the velocity threshold described in the modified example 3. The margin set to the velocity threshold is described below with reference to FIG. 18.

Figure 18:
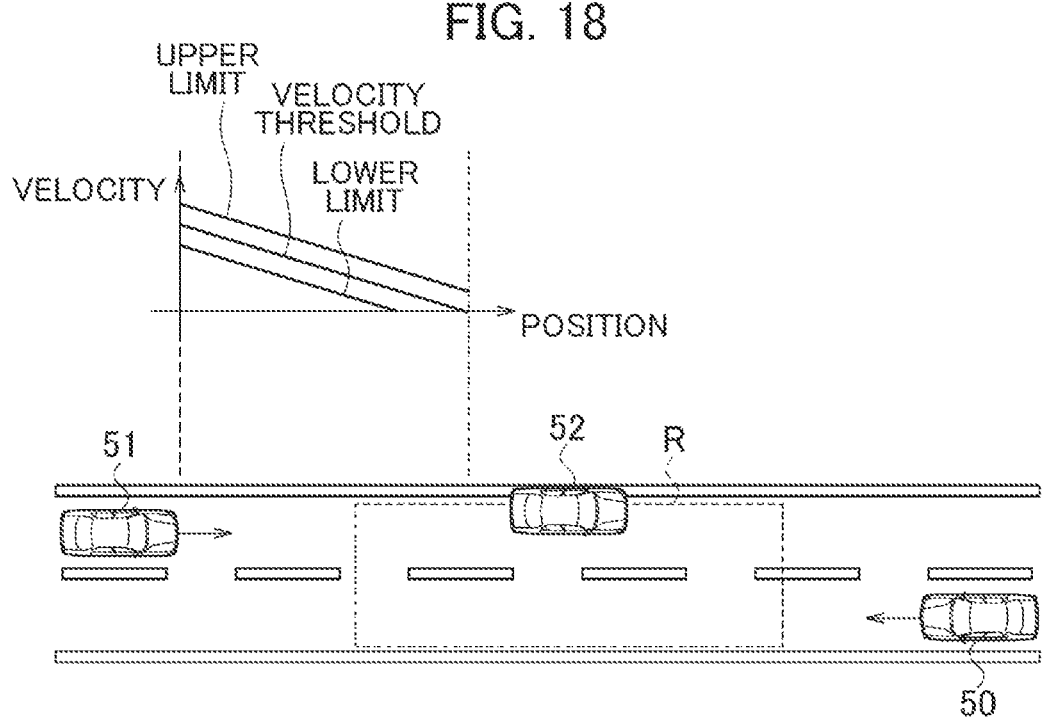
FIG. 18 is a view explaining a margin set for the velocity threshold.

As illustrated in FIG. 18, the controller 20 sets an upper limit value and a lower limit value each as a margin for the velocity threshold. The upper limit value is set to a value with a margin of +10% with respect to the velocity threshold. Similarly, the lower limit value is set to a value with a margin of −10% with respect to the velocity threshold. The respective values of the margins of +10% and −10% may be changed as appropriate.

The first score calculation unit 23 calculates the first score to be 1 when the velocity of the oncoming vehicle 51 is greater than the upper limit value of the velocity threshold. The first score calculation unit 23 calculates the first score to be 0 when the velocity of the oncoming vehicle 51 is greater than or equal to the upper limit value of the velocity threshold and less than or equal to the lower limit value of the velocity threshold. The first score calculation unit 23 calculates the first score to be −1 when the velocity of the oncoming vehicle 51 is less than the lower limit value of the velocity threshold. Setting the upper limit value and the lower limit value to the velocity threshold to make a comparison with the velocity of the oncoming vehicle 51 can estimate the intention of the driver of the oncoming vehicle 51 more carefully.

The margin may also be set to the acceleration rate threshold described in the modified example 4. The setting method is the same as the setting method in the case of the velocity threshold. The second score calculation unit 24 calculates the second score to be 1 when the acceleration rate of the oncoming vehicle 51 is greater than the upper limit value of the acceleration rate threshold. The second score calculation unit 24 calculates the second score to be 0 when the acceleration rate of the oncoming vehicle 51 is less than or equal to the upper limit value of the acceleration rate threshold and greater than or equal to the lower limit value of the acceleration rate threshold. The second score calculation unit 24 calculates the second score to be −1 when the acceleration rate of the oncoming vehicle 51 is less than the lower limit value of the acceleration rate threshold. Setting the upper limit value and the lower limit value to the acceleration rate threshold to make a comparison with the acceleration rate of the oncoming vehicle 51 can estimate the intention of the driver of the oncoming vehicle 51 more carefully.

Modified Example 6

Next, modified example 6 of the present embodiment is described below.

In the modified example 6, the integration score is multiplied by a coefficient corresponding to the width (the vehicle width) of the parked vehicle 52. The coefficient corresponding to the vehicle width of the parked vehicle 52 is described below with reference to FIG. 19.

Figure 19:
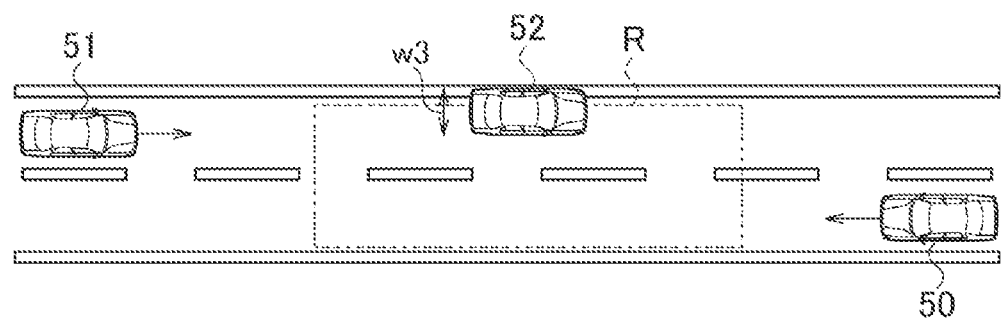
FIG. 19 is a view explaining a vehicle width of a parked vehicle.

As illustrated in FIG. 19, the integration score calculation unit 25 multiplies the integration score by the coefficient corresponding to the vehicle width W3 of the parked vehicle 52 so as to calculate a final integration score. The vehicle width W3 of the parked vehicle 52 is obtained by the sensor 11. The coefficient is set to be smaller as the vehicle width W3 of the parked vehicle 52 is larger, for example. The final integration score s is given by the following equation (9):

$$s = k(s_1\omega_2 + s_2\omega_2\omega_1) \qquad (9)$$

where k is the coefficient.

The driver of the oncoming vehicle 51 needs to project to the traveling lane of the host vehicle 50 more greatly so as to avoid the parked vehicle 52 as the vehicle width W3 of the parked vehicle 52 is greater. In addition, it is harder for the driver of the oncoming vehicle 51 to see the front side so as to recognize the number of parked vehicles as the vehicle width W3 of the parked vehicle 52 is greater. The probability is higher that the driver of the oncoming vehicle 51 waits the host vehicle 50 to pass by as the vehicle width W3 of the parked vehicle 52 is greater. The use of the integration score multiplied by the coefficient corresponding to the vehicle width of the parked vehicle 52 can estimate the intention of the driver of the oncoming vehicle 51 with a high accuracy.

The coefficient k may be set to be smaller than one when the vehicle width W3 of the parked vehicle 52 is greater than or equal to a predetermined value. The use of the integration score based on the vehicle width W3 of the parked vehicle 52 can estimate the intention of the driver of the oncoming vehicle 51 with a high accuracy.

The coefficient k may be set to be larger than or equal to one when the vehicle width W3 of the parked vehicle 52 is less than the predetermined value. As described above, the driver of the oncoming vehicle 51 needs to project to the traveling lane more greatly so as to avoid the parked vehicle 52 as the vehicle width W3 of the parked vehicle 52 is greater. In addition, it is harder for the driver of the oncoming vehicle 51 to see the front side so as to recognize the number of parked vehicles as the vehicle width W3 of the parked vehicle 52 is greater. In other words, the part of the oncoming vehicle 51 projecting to the traveling lane is decreased, and the driver of the oncoming vehicle 51 can see the front side so as to recognize the number of parked vehicles more easily, as the vehicle width W3 of the parked vehicle 52 is smaller. The probability is thus higher that the driver of the oncoming vehicle 51 tries to pass by the parked vehicle 52 without waiting for the host vehicle 50 as the vehicle width W3 of the parked vehicle 52 is smaller. The vehicle control device 1 then may multiply the integration score by the coefficient k of greater than or equal to one when the vehicle width W3 of the parked vehicle 52 is less than the predetermined value. The use of the integration score based on the vehicle width W3 of the parked vehicle 52 thus can estimate the intention of the driver of the oncoming vehicle 51 with a high accuracy.

When the stationary object is not the parked vehicle 52 but is a fallen object or a pylon, the width of the stationary object refers to the width of the stationary object in the width direction of the road.

The respective functions described above in the embodiment can be implemented in single or plural processing circuits. The respective processing circuits include a programmed processing device, such as a processing device including an electric circuit. The respective processing circuits include an application-specific integrated circuit (ASIC) configured to execute the functions described above, and a device such as a circuit component.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, the present embodiment has been illustrated above with the case of the straight road, but may also be applied to a case of a curved road.

REFERENCE SIGNS LIST

1 Vehicle Control Device
10 Gps Receiver
11 Sensor
12 Map Database
20 Controller
21 No-passing Region Setting Unit
22 Passing Position Calculation Unit
23 First Score Calculation Unit
24 Second Score Calculation Unit
25 Integration Score Calculation Unit
26 Velocity Determination Unit
27 Vehicle Control Unit
30 Actuator

The invention claimed is:

1. A vehicle control method comprising:
   detecting a position of a stationary object on a road on which a host vehicle is traveling;
   detecting a velocity of the host vehicle;
   detecting a position and a velocity of an oncoming vehicle traveling in a direction opposite to a traveling direction of the host vehicle in an oncoming lane adjacent to a traveling lane in which the host vehicle is traveling;
   setting a region including the stationary object on the road defined within a predetermined distance from the stationary object along an extending direction of the road;
   calculating a passing position at which the host vehicle and the oncoming vehicle pass each other in accordance with the velocity of the host vehicle and the position and the velocity of the oncoming vehicle;
   calculating a first score that is a larger value as the velocity of the oncoming vehicle is greater;
   calculating a second score that is a larger value as an acceleration rate of the oncoming vehicle is greater;
   integrating the first score with the second score so as to calculate an integration score; and
   causing the host vehicle to decelerate when the integration score is greater than or equal to a predetermined value or causing the host vehicle to keep the velocity or accelerate when the integration score is smaller than the predetermined value in a case in which the passing position is present within the region.

2. The vehicle control method according to claim 1, wherein the second score is multiplied by a first weight that is a larger value as the oncoming vehicle comes closer to the stationary object.

3. The vehicle control method according to claim 2, wherein an increase rate of the first weight with respect to a change in distance in a direction in which the oncoming vehicle comes close to the stationary object increases as the oncoming vehicle comes closer to the stationary object.

4. The vehicle control method according to claim 2, wherein the first score is multiplied by a second weight that is a smaller value as the oncoming vehicle comes closer to the stationary object.

5. The vehicle control method according to claim 4, wherein a decrease rate of the second weight with respect to a change in distance in a direction in which the oncoming vehicle comes close to the stationary object increases as the oncoming vehicle comes closer to the stationary object.

6. The vehicle control method according to claim 4, wherein a sum of the first weight and the second weight is a constant value.

7. The vehicle control method according to claim 1, wherein:
a velocity threshold is set that is a larger value as a distance between the stationary object and the oncoming vehicle is longer; and
the first score is calculated in accordance with a difference between the velocity of the oncoming vehicle and the velocity threshold.

8. The vehicle control method according to claim 1, wherein:
a velocity threshold is set as a first velocity threshold that is a larger value as a distance between the stationary object and the oncoming vehicle is longer;
the first score is calculated to be 1 when the velocity of the oncoming vehicle is greater than or equal to the first velocity threshold; and
the first score is calculated to be 0 when the velocity of the oncoming vehicle is less than the first velocity threshold.

9. The vehicle control method according to claim 8, wherein:
a second velocity threshold is set that is smaller than the first velocity threshold;
the first score is calculated to be 1 when the velocity of the oncoming vehicle is greater than or equal to the first velocity threshold;
the first score is calculated to be 0 when the velocity of the oncoming vehicle is less than the first velocity threshold and greater than or equal to the second velocity threshold; and
the first score is calculated to be −1 when the velocity of the oncoming vehicle is less than the second velocity threshold.

10. The vehicle control method according to claim 1, wherein:
an acceleration rate threshold is set that is a larger value as a distance between the stationary object and the oncoming vehicle is longer; and
the second score is calculated in accordance with a difference between the acceleration rate of the oncoming vehicle and the acceleration rate threshold.

11. The vehicle control method according to claim 1, wherein:
an acceleration rate threshold is set as a first acceleration rate threshold that is a larger value as a distance between the stationary object and the oncoming vehicle is longer;
the second score is calculated to be 1 when the acceleration rate of the oncoming vehicle is greater than or equal to the first acceleration rate threshold; and
the second score is calculated to be 0 when the acceleration rate of the oncoming vehicle is less than the first acceleration rate threshold.

12. The vehicle control method according to claim 11, wherein:
a second acceleration rate threshold is set that is smaller than the first acceleration rate threshold;
the second score is calculated to be 1 when the acceleration rate of the oncoming vehicle is greater than or equal to the first acceleration rate threshold;
the second score is calculated to be 0 when the acceleration rate of the oncoming vehicle is less than the first acceleration rate threshold and greater than or equal to the second acceleration rate threshold; and
the second score is calculated to be −1 when the acceleration rate of the oncoming vehicle is less than the second acceleration rate threshold.

13. The vehicle control method according to claim 1, wherein:
an upper limit value and a lower limit value are set to a velocity threshold;
the first score is calculated to be 1 when the velocity of the oncoming vehicle is greater than the upper limit value;
the first score is calculated to be 0 when the velocity of the oncoming vehicle is less than or equal to the upper limit value and greater than or equal to the lower limit value; and
the first score is calculated to be −1 when the velocity of the oncoming vehicle is less than the lower limit value.

14. The vehicle control method according to claim 1, wherein:
an upper limit value and a lower limit value are set to an acceleration rate threshold;
the second score is calculated to be 1 when the acceleration rate of the oncoming vehicle is greater than the upper limit value;
the second score is calculated to be 0 when the acceleration rate of the oncoming vehicle is less than or equal to the upper limit value and greater than or equal to the lower limit value; and
the second score is calculated to be −1 when the acceleration rate of the oncoming vehicle is less than the lower limit value.

15. The vehicle control method according to claim 1, wherein the integration score is multiplied by a coefficient that is a smaller value as a width of the stationary object in a width direction of the road is greater so as to calculate a final integration score.

16. The vehicle control method according to claim 1, wherein the integration score is multiplied by a coefficient of smaller than 1 when a width of the stationary object in a width direction of the road is greater than or equal to a predetermined value so as to calculate a final integration score.

17. The vehicle control method according to claim 1, wherein the integration score is multiplied by a coefficient of larger than or equal to 1 when a width of the stationary object in a width direction of the road is smaller than a predetermined value so as to calculate a final integration score.

18. A vehicle control device comprising:
a first sensor configured to detect a position of a stationary object on a road on which a host vehicle is traveling;
a second sensor configured to detect a velocity of the host vehicle;
a third sensor configured to detect a position and a velocity of an oncoming vehicle traveling in a direction opposite to a traveling direction of the host vehicle in an oncoming lane adjacent to a traveling lane in which the host vehicle is traveling; and
a controller configured to control a traveling state of the host vehicle in accordance with data detected by the first sensor, the second sensor, and the third sensor,
the controller being configured to:
set a region including the stationary object on the road defined within a predetermined distance from the stationary object along an extending direction of the road;
calculate a passing position at which the host vehicle and the oncoming vehicle pass each other in accordance with the velocity of the host vehicle and the position and the velocity of the oncoming vehicle;

calculate a first score that is a larger value as the velocity of the oncoming vehicle is greater;

calculate a second score that is a larger value as an acceleration rate of the oncoming vehicle is greater;

integrate the first score with the second score so as to calculate an integration score; and cause the host vehicle to decelerate when the integration score is greater than or equal to a predetermined value or causing the host vehicle to keep the velocity or accelerate when the integration score is smaller than the predetermined value in a case in which the passing position is present within the region.

* * * * *